United States Patent [19]
Barnes et al.

[11] Patent Number: 5,254,266
[45] Date of Patent: Oct. 19, 1993

[54] OIL SPILL CLEANUP CRAFT AND METHOD USING CATAMARAN WITH EXCEPTIONAL STABILITY

[75] Inventors: Michael D. Barnes, Hazen; Craig R. Fischer, Garrison, both of N. Dak.

[73] Assignee: Aquatron, Inc., Garrison, N. Dak.

[21] Appl. No.: 847,941

[22] Filed: Mar. 6, 1992

[51] Int. Cl.$^5$ .............................................. B01D 17/02
[52] U.S. Cl. ..................................... 210/776; 114/61; 210/182; 210/242.3; 210/259; 210/923
[58] Field of Search .................... 210/96.1, 122, 198.1, 210/177, 182, 184, 187, 242.3, 257.1, 258, 521, 522, 776, 800, DIG. 5, 923, 360.12, 512.1, 85, 259, 513, 768, 242.1; 405/66, 166; 114/61, 264–266

[56] References Cited

U.S. PATENT DOCUMENTS

| | | | |
|---|---|---|---|
| 61,880 | 2/1867 | Serrell | 210/923 |
| 3,804,177 | 4/1974 | Renfroe | 210/923 |
| 3,951,810 | 4/1976 | Crisafuui | 210/923 |
| 3,966,613 | 6/1976 | Kirk et al. | 210/923 |
| 4,108,773 | 8/1978 | Macaluso | 210/242.3 |
| 5,022,987 | 6/1991 | Wells | 114/61 |
| 5,173,182 | 12/1992 | Debellian | 210/242.3 |

OTHER PUBLICATIONS

AIAA-89-152Q "SWATH Evolution: From Ideas to Ships", T. Lang, International Advanced Marine Vehicles Conference, Arlington, Va. Jun. 5 to Jun. 7, 1989.
"The Swath Ship Concept and Its Potential", T. Lang, AIAA/SNAME Advanced Marine Vehicles Conference, San Diego, Calif., Apr. 17 to Apr. 19, 1978.

Primary Examiner—Joseph W. Drodge
Attorney, Agent, or Firm—Robert R. Keegan; Daniel R. Alexander

[57] ABSTRACT

A self-contained oil spill cleanup craft and method which operates well in both rough and calm seas, is rapidly deployed, which provides high flow rate continuous separation and processing of recovered oil and water mixtures, and outputs water which is substantially free of oil and oil which is substantially free of water and other contaminants and, as such, refinery ready without further processing. The craft of the present invention can be used, for example, to clean up light and medium weight crude oil, lubricating oil, or diesel fuel that is floating on the surfaces of either fresh or salt water. In accordance with an exemplary embodiment of the present invention, a small waterplane area twin hull boat having respective pontoons attached to the base of each hull is equipped with a scoop for recovering oil and water, separation and processing equipment for separating and purifying the recovered oil and water, high volume pumps for transferring the oil and water from the scoop to the separation and processing equipment, and storage elements for storing refinery grade oil and dry sludge.

37 Claims, 6 Drawing Sheets

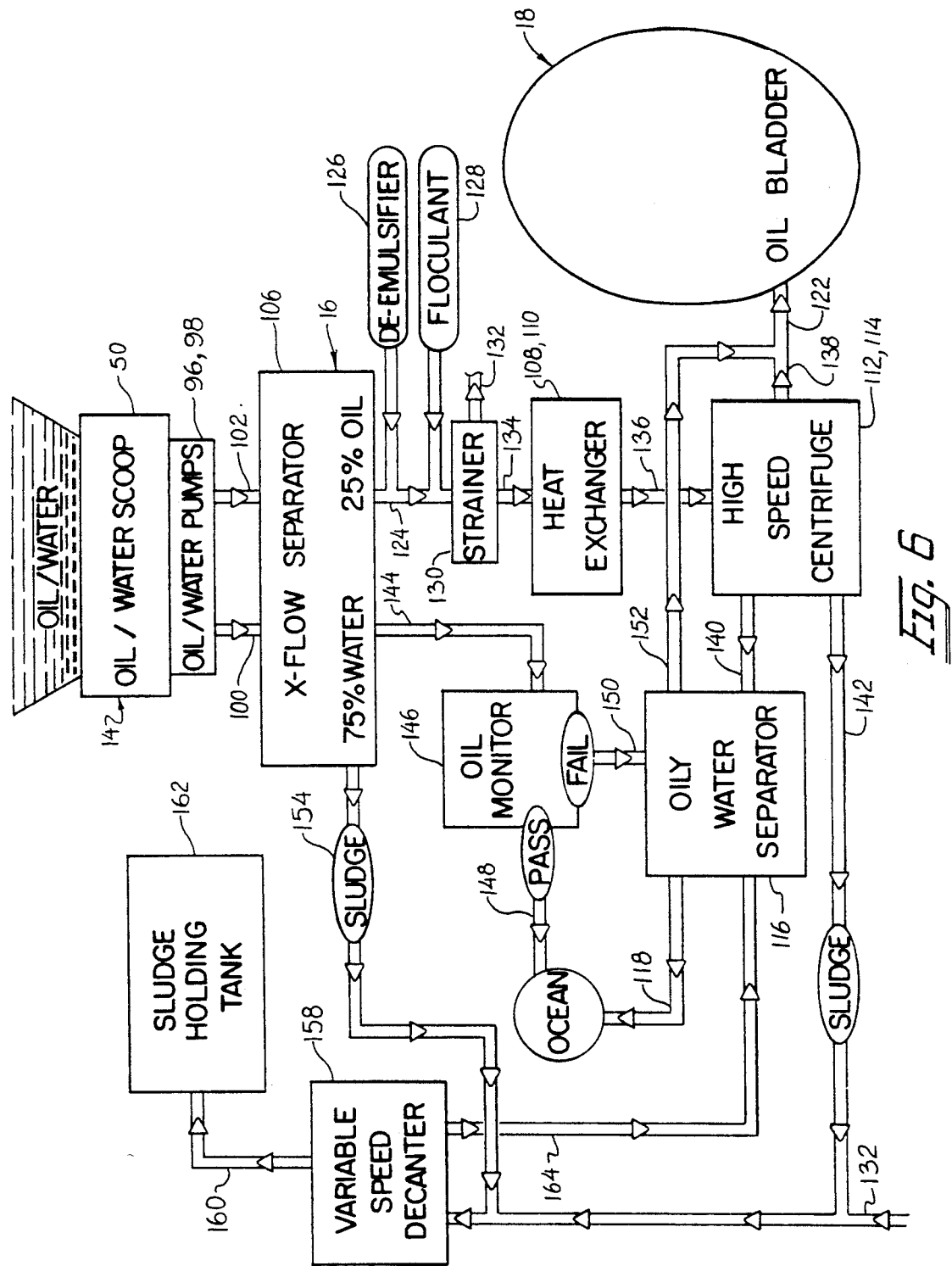

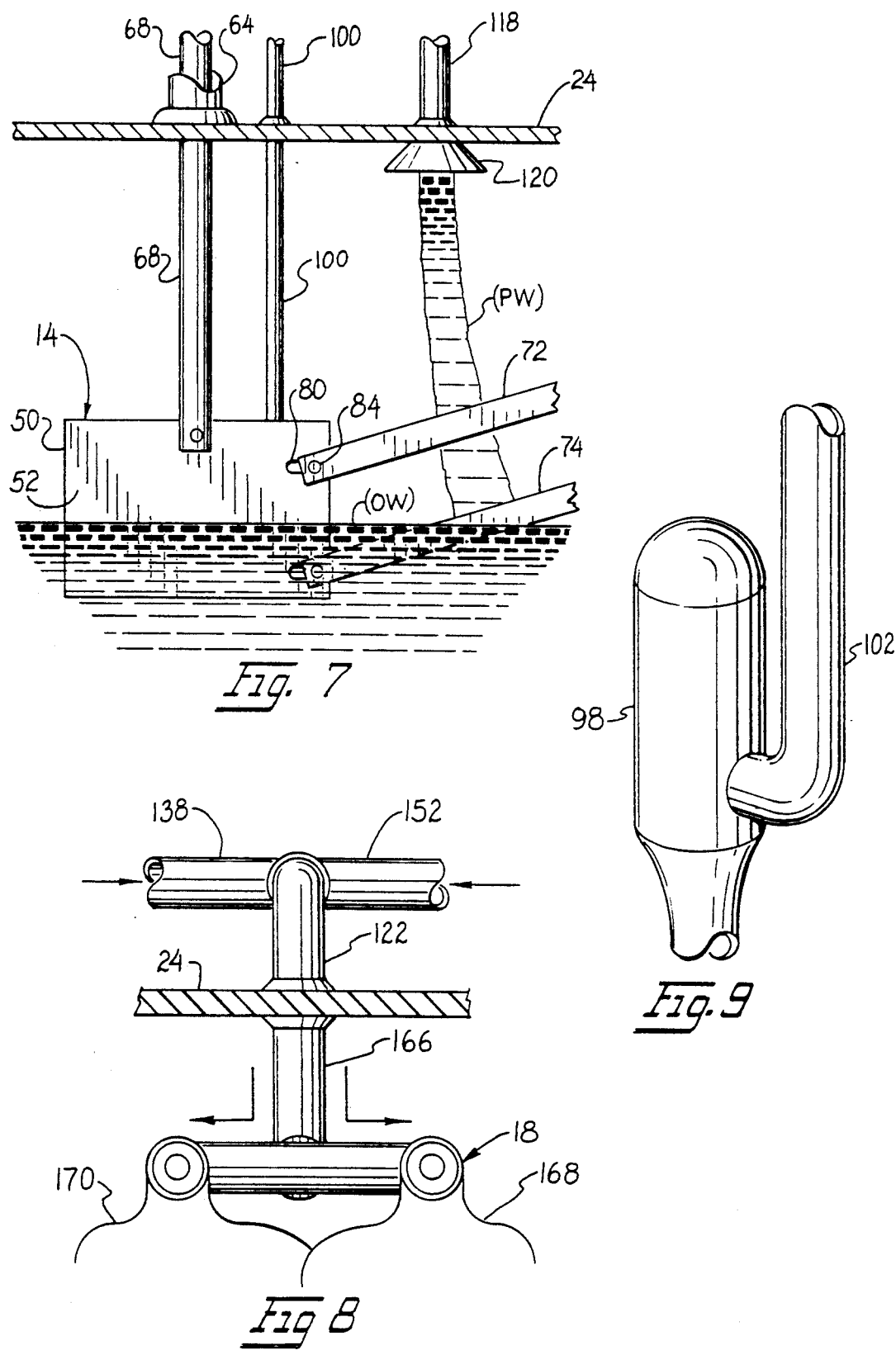

OIL SPILL CLEANUP CRAFT AND METHOD USING CATAMARAN WITH EXCEPTIONAL STABILITY

BACKGROUND OF THE INVENTION

The present invention is directed to an apparatus for cleaning up oil spills on bodies of fresh or salt water and, more particularly, concerns a small waterplane area twin hull boat equipped with a scoop for recovering oil and water and equipment for continuous flow separation and processing of the recovered oil and water into water that is clean enough to be returned to the body of water and oil that can be used for its intended commercial purpose without further processing.

An oil spill can be devastating to the environment if it is not quickly and effectively cleaned up. Rapid deployment of an oil spill cleanup system is necessary so that the oil does not have time to spread and emulsify with the water. It is not only important to recover as much of the spilled oil as possible to protect the environment, but also to recover the oil for commercial use in order to minimize the loss of a valuable natural resource and to mitigate the financial loss to the oil company involved. Oil spill cleanup operations using conventional oil spill cleanup systems can be tremendously expensive in terms of equipment, manpower, transportation, storage, and processing costs.

Typically, an oil spill is cleaned up by deploying a large number of floating booms to surround a portion of the spill, using a number of skimming craft for skimming the oil and water mixture from the surface of the body of water, pumping this recovered oil and water mixture into temporary floating storage vessels, such as rubber or plastic bladders, barges, or small tankers, then transferring the recovered oil and water mixture from the temporary floating storage vessels to one or more large tanker ships for transporting it to a land based processing facility, and lastly processing this mixture to separate the oil and water, purify the oil so it may be used commercially, and purify the water so it can be returned to the body of water or disposed of safely. In this conventional cleanup process the recovered oil and water mixture requires a great deal of storage and transportation facilities because water accounts for a large portion of the mixture, for example 70% of the volume of recovered material.

Conventional oil skimming apparatus for removing oil films from the surface of large bodies of water using, for example, a floating vessel with booms attached thereto for collecting the water and oil mixture and having a settling tank for separating the oil and water mixture, such as described in U.S. Pat. No. 3,348,690, are rendered virtually ineffective by rough seas and do not provide for high volume continuous processing and separation of the recovered oil and water mixture. Further, such conventional oil spill cleanup systems are not capable of being transported rapidly for rapid deployment, such as by helicopter or high speed boat, require excessive storage space for the recovered oil and water mixture, and involve large transportation costs for transferring the recovered oil and water to a land based processing facility.

Moreover, conventional oil spill cleanup equipment, such as described in U.S. Pat. Nos. 3,756,414, and 4,368,122, provide for the skimming of an oil and water mixture from the surface of a body of contaminated water, but require that this skimmed oil and water mixture be stored and later processed to separate the oil and water and clean the oil for commercial use. Such a multi-step process of collecting, storing, and processing the oil and water is not cost effective since the high water content of the recovered oil and water mixture unnecessarily increases storage and transportation costs and the processing facilities may be located a great distance away from the oil spill requiring the recovered oil and water to be shipped over large distances.

U.S. Pat. No. 3,743,095 describes a vortex flow system for separating oil from an oil and water mixture useful in oil spill cleanup equipment having a skimmer for removing a mixture of oil and water from the surface of the contaminated body of water, a high capacity pump, one or more vortex separators, a tank for temporary storage of the recovered oil, and exhaust nozzles for returning water with a greatly reduced amount of oil to the body of water from which it was removed. Current regulations which address environmental issues require that there be a very low level of contaminants in water which is returned to the body of water from which it was removed. As such, it is unlikely that a vortex separator can provide sufficient cleaning of the contaminated water at high flow rates to allow the water to be returned directly to the body of water from which it was removed. Further, such a vortex flow system does not provide for processing of the recovered oil so that it is in condition to be used commercially, such as at a refinery, without further processing.

Thus, there exists a need for an improved oil spill cleanup apparatus and method which provides for rapid deployment, is effective in both calm and rough seas, can quickly recover large quantities of oil and water, and can separate and process the returned to the body of water from which it was removed and oil to to be used for its intended commercial purpose without further processing.

SUMMARY OF THE INVENTION

In accordance with the present invention, a self-contained oil spill cleanup craft and method is provided which operates well in both rough and calm seas, is rapidly deployed, which provides high flow rate continuous separation and processing of recovered oil and water mixtures, and outputs water which is substantially free of oil and oil which is substantially free of water and other contaminants and, as such, refinery ready without further processing. The craft of the present invention can be used, for example, to clean up light and medium weight crude oil, lubricating oil, or diesel fuel that is floating on the surface of either fresh or salt water.

In accordance with an exemplary embodiment of the present invention, a small waterplane area twin hull boat is equipped with a scoop for recovering oil and water, separation and processing equipment for separating and purifying the recovered oil and water, high volume pumps for transferring the oil and water from the scoop to the separation and processing equipment, and storage elements for storing refinery grade oil and dry sludge. The oil is stored in either a tank on board the craft or in one or more bladders which are towed behind the boat.

A principle object of the present invention is the provision of a self-contained oil spill cleanup craft and method that is capable of rapid deployment to oil spill site and is effective at recovering and processing oil and water at the site.

Another object of the present invention is the provision of a oil spill cleanup craft which is able to travel to the oil spill site and clean it under most weather conditions found at sea, short of a hurricane.

A still further object of the present invention is the provision of an oil spill cleanup craft which is operable in both deep and shallow water and, as such, can be used on a sea, ocean, lake, or river.

Yet another object of the present invention is the provision of a height adjustable scoop which allows the scoop to take on as little water as possible under different sea conditions.

A further, and more specific, object of the present invention is the provision of a separation and processing system which will provide refinery quality oil or fuel and a water discharge quality that will meet governmental quality specifications.

Other objects and further scope of the applicability of the present invention will become apparent from the detailed description to follow, taken in conjunction with the accompanying drawings wherein like parts are designated by like reference numerals.

BRIEF DESCRIPTION OF THE DRAWINGS

FIG. 6 is a flow diagram illustration of the scoop, pumps, and separation and processing equipment in accordance with the exemplary embodiment;

FIG. 7 is an enlarged, fragmentary, cross-section illustration of the scoop and water discharge elements of the craft of FIG. 1;

FIG. 8 is an enlarged, fragmentary representation of the oil output and storage elements of the exemplary embodiment;

FIG. 9 is an enlarged, fragmentary, perspective illustration of one of the pumps and associated oversize conduit;

DETAILED DESCRIPTION OF THE PREFERRED EMBODIMENTS

Figure 1:
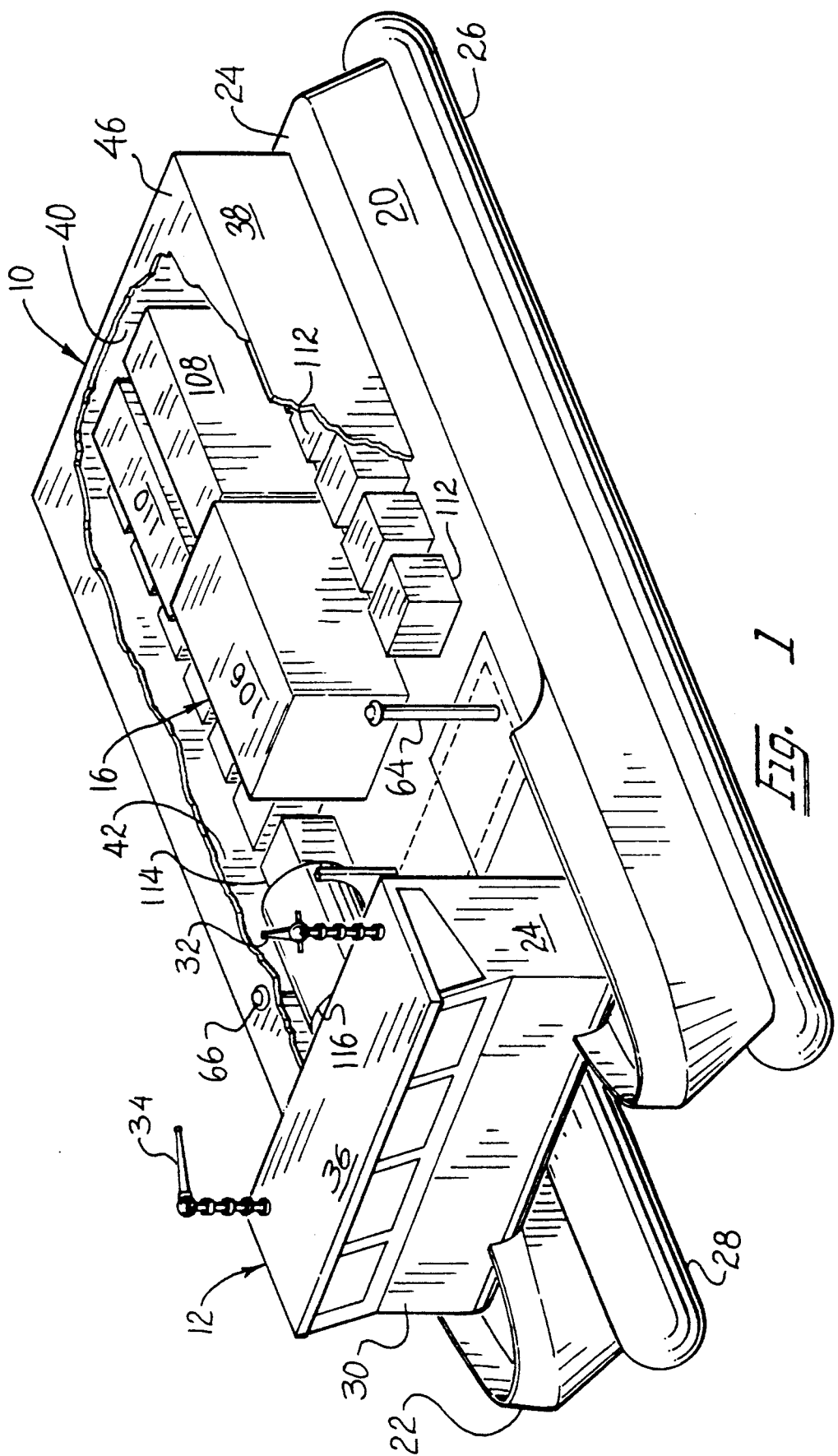
FIG. 1 is a schematic perspective representation of an oil spill cleanup craft in accordance with an exemplary embodiment of the present invention.
Figure 2:
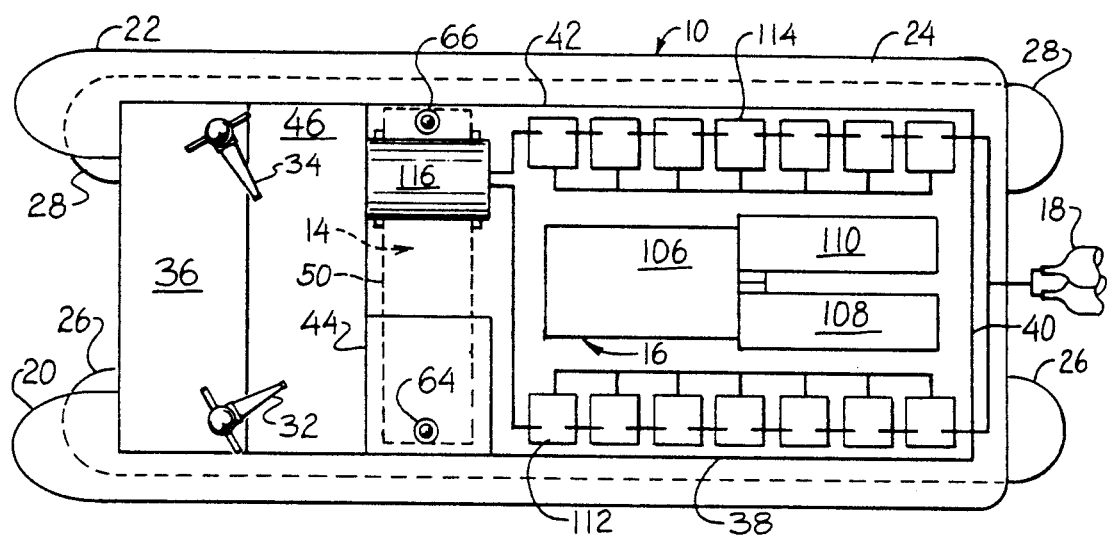
FIG. 2 is a top view illustration of the craft of FIG. 1.

In accordance with an exemplary embodiment of the present invention as shown schematically in FIGS. 1 and 2, and with more detail in FIGS. 3-11, a self-contained oil spill cleanup craft, generally designated by the reference numeral 10, includes a small waterplane area twin hull boat or catamaran 12 equipped with oil recovery apparatus 14, separation and processing equipment 16, and storage elements 18. The catamaran 12 has parallel, spaced, port and starboard hulls 20 and 22 connected at their upper ends by a lower deck structure 24. Each of the hulls 20 and 22 has a respective pontoon 26 and 28 attached to the base of the hull. The boat 12 is shown to include a steering house 30 with firefighting water spray nozzles 32 and 34 extending from a roof 36 of the house 30.

Figure 3:
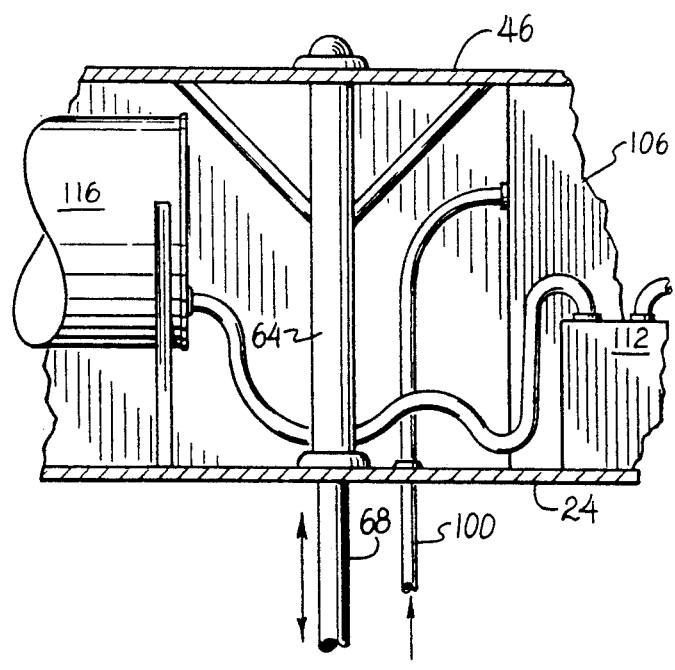
FIG. 3 is an enlarged, fragmentary, cross-section representation of the scoop hydraulics and a portion of the separation and processing equipment of the craft of FIG. 1.

Although the separation and processing equipment 16 is shown in solid lines as being visible in both FIGS. 1 and 2, it is to be understood that these elements are actually enclosed within port, aft, starboard, and bow walls 38, 40, 42, and 44 and covered by an upper deck 46 (FIG. 3). Portions of th wheel house 30, port wall 38, and upper deck 46, are not shown in FIG. 1 so as to provide a clear view of the separation and processing equipment 16. Likewise, a large portion of the upper deck 46 is not shown in FIG. 2 so as to provide a better view of the recovery apparatus 14, separation and processing equipment 16, and storage elements 18.

In accordance with a preferred embodiment, the craft 12 is a small waterplane area twin hull boat (SWATH) designed by Alan C. McClure Associates, Inc., Houston, Tex., which is modified in accordance with the present invention to include the recovery apparatus 14, separation and processing equipment 16, and storage elements 18. Such a craft has an overall length of about 120 feet from bow to stern, an overall width of about 40 feet from the exterior of the port hull to the exterior of the starboard hull, draws from about 12 to 15 feet, and has a gap of about 20 feet between the port and starboard hulls which extends the full length of the craft. The boat is provided with twin diesel engines which can propel the craft at a maximum speed of about 30 knots. This craft is designed to operate in almost all weather conditions, short of a hurricane. The catamaran design having spaced, parallel, twin hulls and submerged pontoons at the base of each of the hulls provides this craft with exceptional stability compared with other conventional ocean-going vessels. The craft rides the swell of the sea but remains steady, does not pitch or sway and stays at the same depth.

Although it is not shown in the drawings, it is to be understood that the craft 12 includes numerous doorways, stairwells, hatches, ladders, etc. which provide the crew with access to the steering cabin 30, the hulls 20 and 22, the recovery apparatus 14, the separation and processing equipment 16, and the storage elements 18. Also, it is contemplated that the craft 12 would include numerous guard rails and support structures, guidance equipment and antennas, booms and cranes and other common equipment used on ocean going vessels. The hulls 20 and 22 contain heads, sleeping quarters, and dining facilities capable of supporting a crew of twelve for an extended voyage. The engines are located in the pontoons, and the engine fuel tanks are located in the hulls With reference to FIGS. 1-3, 5, 7, and 10-11, the recovery apparatus 14 includes a height adjustable scoop 50 having vertical side walls 52 and 54, a substantially horizontal base 56, a downwardly sloping top 58, an open front 60, and a closed rear 62. The apparatus 14 further includes a pair of hydraulic cylinders 64 and 66 each having respective extension and retraction rods 68 and 70 extending downwardly therefrom and connected to respective scoop side walls 52 and 54.

Figure 5:
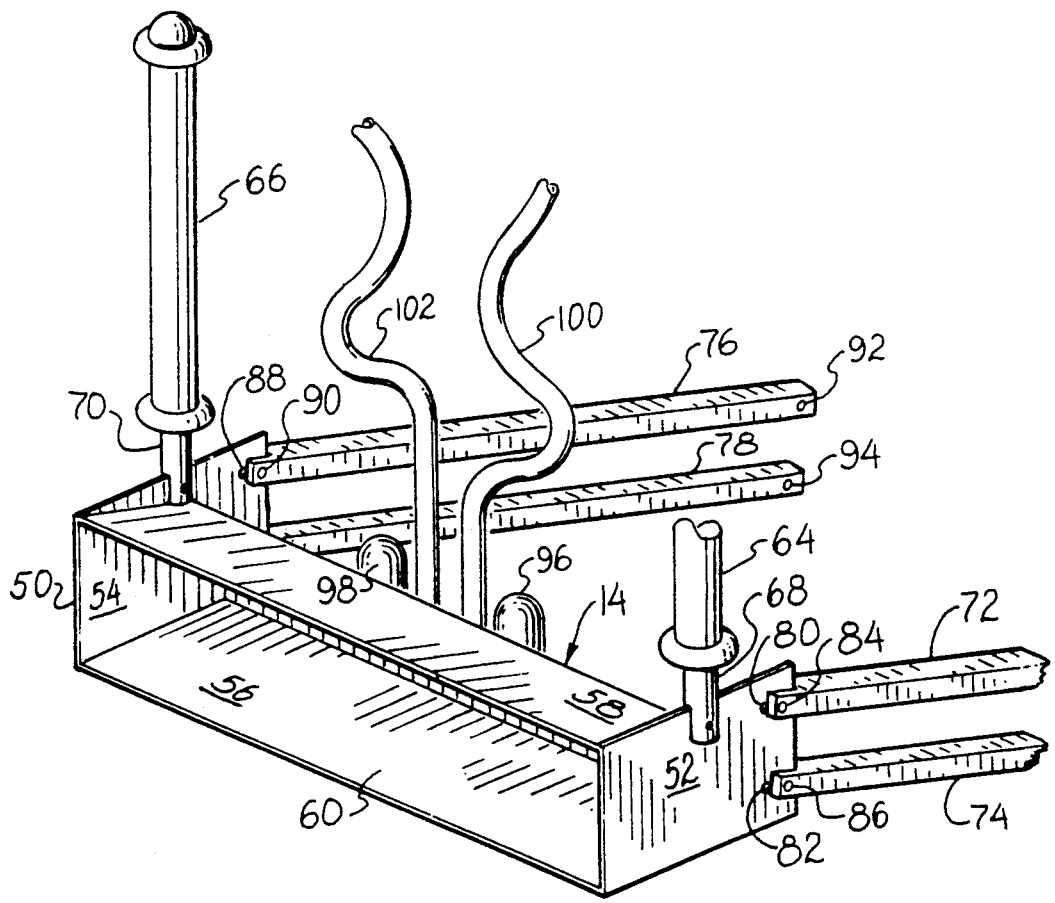
FIG. 5 is an enlarged, perspective representation of the adjustable scoop and pumps of the craft of FIG. 1.

The recovery apparatus 14 further includes two pair of pivot and support members 72 and 74 and 76 and 78 with the first pair, 72 and 74, connected to the rear of the scoop side member 52 via a pin and slot arrangement including slots 80 and 82 in the sidewall 52 and pins 84 and 86 in the forward end of the members 72 and 74. Likewise, the support members 76 and 78 extend rearwardly from the rear of the scoop side wall 54 via a pin and slot arrangement having slots in the rear of the scoop side member 54 and pins in the front end of the support members 76 and 78. Although only a slot 88 and pin 92 of the pin and slot arrangement for the upper support member 76 is shown in FIG. 5, it is to be understood that the support member 78 is connected to the scoop in a similar fashion. The rear end of each of the support members, 72, 74, 76, and 78, includes a cylindrical opening, such as the openings 92 and 94 in the rear ends of the support members 76 and 78, designed to receive bolts or pins for providing a pivotal connection to either the inner surface of respective hull 20 and 22 or vertically oriented bracket members (not shown) extending downwardly from the under surface of the lower deck 24.

The recovery apparatus 14 also includes a pair of high volume pumps 96 and 98 mounted in the rear of the scoop 50 as described in more detail below. Each of the pumps has an associated oversized conduit 100 and 102, such as a flexible hose, having one end connected to one of the pumps 96 and 98 and the other end connected to the separation and processing equipment 16.

With reference again to FIGS. 3, 5, and 7 of the drawings, the scoop 50 is height adjustable in that the hydraulic units 64 and 66 are operated to either extend or retract the shafts 68 and 70 to move the scoop 50 from the fully raised inoperative position shown in FIG. 5 to the fully extended or lowered operative position shown in FIG. 7. With each of the hydraulic units 64 and 66 operated so as to fully retract the rods 68 and 70 and thereby raise the scoop 50 to its inoperative position up out of the water, the craft 12 can be operated at full speed and be rapidly deployed to the site of an oil spill. With each of the shafts 68 and 70 extended so as to lower the scoop 50 into the water for recovery of oil and water from the water's surface (ow) as shown in FIG. 7, the craft 12 is operated at between 0.5 to 5 knots with the scoop 50 receiving about 3800 gallons per minute through the front opening 60. The height of the scoop 50 in the water is adjusted depending on the weather conditions, the type of oil being recovered, outside temperatures, and the speed of the craft so as to take on as little water as possible while, at the same time, recovering as much of the spilled oil or fuel. For example, the scoop is vertically adjusted relative to the water line so that the base 56 is about three to eight inches below the surface of the water during the oil recovery process. Although the scoop is shown substantially horizontal in FIG. 7, it is contemplated that the scoop 50 may be operated with a slight tilt down of the rear of the scoop relative to the front of from about 0° to 5°. With the craft 12 being a small waterplane area twin hull boat or catamaran, the depth at which the craft runs and the height of the water line along each of the hulls remains substantially constant so that it is possible to adjust the vertical position of the scoop 50 relative to the water line so as to maximize oil and fuel recovery while minimizing the intake of water.

The scoop and its associated support members and hydraulic units are of heavy duty construction so that the scoop can withstand the severe, dynamic forces created during oil recovery in rough seas and at an operating speed of 5 knots. As illustrated in FIGS. 1-3 and 7, each of the hydraulic units 64 and 66 is secured to both the upper and lower decks 46 and 24 to insure that the hydraulic units remain in their vertical position during operation of the scoop 50. Further, the support members 72, 74, 76, and 78 provide added support to the scoop 50 to keep it from twisting or buckling during operation.

As illustrated in FIGS. 1 and 2 of the drawings, the separation in processing equipment 16 includes as major components a cross-flow separator 106, the pair of heat exchangers 108 and 110, two banks of high speed centrifuges 112 and 114, and an oily water separator 116. Generally, the separation and processing equipment 16 receives recovered oil and water from the scoop 50 and pumps 96 and 98 along flexible conduits 100 and 102 which are connected to the cross-flow separator 106. The separation and processing equipment 16 processes and purifies the oil and water mixture in order to separate the oil and water components and purify the separated components sufficiently to allow the water (PW) to be discharged back to the body of water through a main water discharge line 118 which is connected to a water discharge nozzle 120 as shown in FIG. 7. The purified oil component is fed along a main oil discharge line 122 to the oil storage element 18 as shown in FIGS. 2, 6, and 8.

As shown in more detail in FIG. 6 of the drawings, in accordance with one embodiment of the present invention, the cross-flow separator 106 receives a recovered oil and water mixture along the conduits 100 and 102. The cross-flow separator 106 is preferably a multiple corrugated plate collator which hydraulically separates the oil and water by adjusting the velocity gradients through the phases of separation. The separator 106 outputs separate oil and water streams, each having about 3-5% contaminants. In one example, the pumps 96 and 98 pump about 3800 gallons per minute of oil and water to the cross-flow separator 106. The separator 106 outputs about approximately 1000 gallons per minute oil and 2800 gallons per minute of water, roughly 4:1 ratio of oil and water input to oil output.

Figure 4:
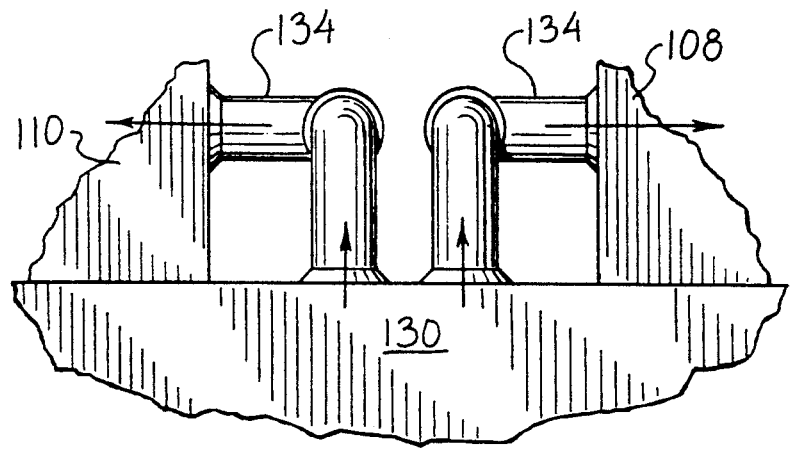
FIG. 4 is an enlarged, fragmentary, top view illustration of the fluid connection between the strainer and heat exchangers in the craft of FIG. 1.

The oil stream output of the cross-flow separator 106 travels along a line 124 having means 126 and 128 for adding deemulsification aiding chemicals and flocculent type chemicals for stripping the oil film off any solid particles in the oil stream. Next, the oil passes through a strainer 130 having a simple mesh for separating out solid particles of approximately one-half inch in diameter or larger. The strained out solid particles are output along a line 132. With reference to FIG. 4 of the drawings, the strainer 130 has a pair of outputs 134 each feeding to a respective heat exchanger 108 and 110.

The strained oil passes to the heat exchangers 108 and 110 which utilize steam to heat the oil to 175° to 200° Fahrenheit, so as to enhance the separation of the microscopic water molecules from the oil. This heating process also significantly reduces the viscosity of the oil, facilitates separation, and increases the flow rate of the oil.

The hot oil output of the heat exchangers 108 and 110 is transferred via lines 136 to two banks of high speed centrifuges 112 and 114 these centrifuges are preferably high speed disc centrifuges which effect a centrifugal force of a minimum of 4500 G's which will separate the emulsified oil into its oil, water, and solids components. The purified oil output of the high speed centrifuges is transferred along lines 138 to the oil discharge line 122 and fed to the oil storage elements 18. The oil output of the high speed centrifuges is clean enough for refinery use, so it can be directly used for its intended purpose prior to the oil spill without further processing. The purified water output of the high speed centrifuges 112 and 114 is fed along lines 140 to the oily water separator 116 for further processing. The solids output of the high speed centrifuges 112 and 114 is output along line 142 for further processing.

The water stream output of the cross-flow separator 106 is sent along line 144 to an oil monitor 146. The water stream output of the cross-flow separator 106 may have added to it de-emulsifiers to aid in separation and floculants depending on the chemical quality of the water stream. In accordance with the preferred embodiment, the oil monitor 146 is an oil concentration detector with a zero to one hundred parts per million adjustable range, and which provides continuous sampling every fifteen seconds. The water stream should have less than fifty parts per million foreign material if it is to be returned directly to the body of water. Water which passes this test by the oil monitor 146 is allowed to pass along line 148 directly to return to the body of water. Water which passes through the oil monitor and fails this test is directed along line 150 to the oily water separator 116 for further purification. In accordance with the preferred embodiment, the oily water separator 116 is a liquid/liquid type hydrocyclone used with an oil weir. The treated water should have less than 50 parts per million foreign material before it is discharged back into the original body of water along line 118. The oil output of the oily water separator 116 will be passed directly to the oil storage means 18 if it is of high quality and as such refinery ready, or added to the oil stream output 124 of the cross-flow separator for further processing. Sludge 154 coming from the cross-flow separator 106, solids 132 from the strainer 130, and sludge 142 coming from the high speed centrifuges 112 and 114 is fed to a sludge processing means 158 which is preferably a variable speed decanter for separating oily water from the sludge. The sludge processor 158 has a dry sludge output 160 which is fed to a sludge holding tank 162. The processor 158 also has an oily water output 164 which is sent to the oily water separator 116 for separation into its oil and water components. The sludge in the sludge processsor 158 is chemically treated to release the oil and water from the sludge so as to separate the incoming sludge into a dry sludge output 160 and oily water output 164.

With reference to FIGS. 2, 6 and 8 of the drawings, the storage element 18 is preferably a pair of rubber or plastic bladders 168 and 170 which are towed behind the craft 12 in a conventional manner. The oil output line 122 receives the oil output 138 of the high speed centrifuges 112 and 114 and also the oil output 152 of the oily water separator 116. This combined oil output passes from line 122 to a T-structure 166 having therein a valve for directing the oil output to only one of the oil bladders 168 or 170 at a time. Although it is not preferred, it is to be understood that the processed and refinery grade oil output of the separation and processing equipment 16 may be stored in, for example, a floating barge which is towed behind the craft 12, or in tanks on the craft 12 itself.

In accordance with a preferred embodiment of the present invention, the processing and separation equipment 16 is electrically driven rather than being powered by hydraulics. For example, the high volume pumps 96 and 98 are driven by thirty horsepower electric motors, and the centrifuges 112 and 114 are driven by twenty horsepower electric motors.

With 3800 gallons per minute of oil and water mixture being fed to the separation and processing equipment 16 by the recovery apparatus 14, there is an about 1000 gallons per minute oil output stream 124 and 2800 gallon per minute water output stream 144 of the cross-flow separator 106 and an approximately 900 gallon per minute processed refinery grade oil output 122 sent to the storage element 18. This processed refinery grade oil output can vary from about 700 to 1000 gallons per minute depending on factors, such as, the viscosity of the recovered oil, the outside temperature, the amount of solids in the recovery material, the type of material recovered (light or medium weight crude oil, lubricating oil, or diesel fuel), and whether the body of water is salt or fresh water.

With reference to FIGS. 5, 9, 10, and 11 of the drawings, it is preferred that each of the pumps 96 and 98 are screw type centrifugal pumps noted for there ability to pump extremely viscous stringy materials without mixing the material with water. These pumps act like a corkscrew in moving the material and have a centrifugal action which provides efficiency during operation. The pumps 96 and 98 are capable of handling tremendously high volumes of liquids, for example, 2000 gallons per minute. Such pumps are described in U.S. Pat. No. 3,156,190 as dry pit versions. It is preferred to use these types of pumps together with oversized conduits 100 and 102 so as to minimize emulsifying of the oil with the water as the oil and water mixture is pumped from the scoop 50 to the cross-flow separator 106. Although it is preferred to use the above described pumps, it is contemplated that other low velocity, low head pumps may be used.

Figure 10:
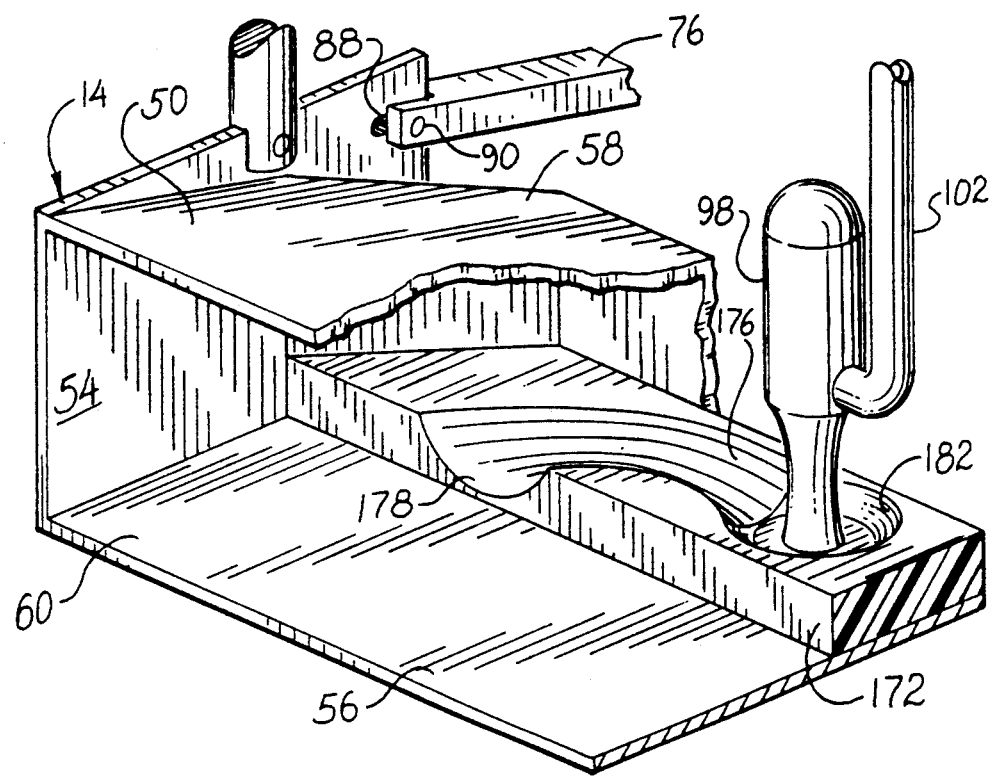
FIG. 10 is a partial, fragmentary, perspective illustration of the scoop and pump arrangement; and, FIG. 11 is a fragmentary, top view representation of the scoop and pump arrangement of the exemplary embodiment.
Figure 11:
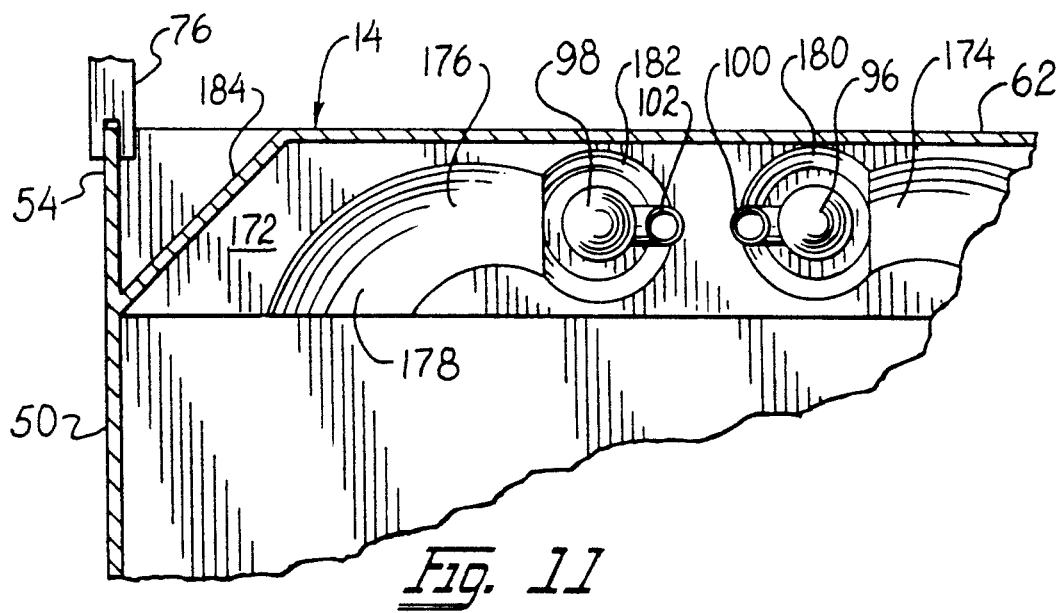

In accordance with a preferred embodiment of the present invention and as shown in FIGS. 10 and 11, the scoop 50 includes a raised portion 172 extending upwardly from the base 56 along the rear portion of the scoop. This raised portion 172 includes two arcuate recesses 174 and 176 each having a respective mouth 178 facing towards the front of scoop and terminating in a circular recess 180 and 182 directly beneath each of the pumps 96 and 98. Each of the arcuate recesses 174 and 176 are wider at the mouth 178 and neck down toward the junction with the respective circular recess 180 and 182 to facilitate the creation of a vortex at the base of each of the pumps 96 and 98 to aid in the removal of extremely viscous liquids (very heavy and thick) and extremely light, volatile liquids. Each of the pumps 96 and 98 have a built in sump which provides for removal of liquid from the scoop regardless of the height of the fluid in the scoop. Each of the rear corners of the scoop 50 has been cut off by a diagonal wall 184 to further facilitate removal of liquid from the entire width of the scoop by directing the liquid toward the pumps 96 and 98 and along the arcuate vortex recesses 174 and 176. The front edge of the riser 172 may be tapered so as to further facilitate removal of fluid from the scoop 50.

In accordance with a particular example of the scoop of the present invention, the scoop has an overall depth from front to rear of 9.4 feet, an overall height from bottom to top at the front of the scoop of 7.8 feet, the height of the riser being 1.1 feet, and the overall height at the rear of the scoop being 2.2 feet. The width of the scoop is dependent on the width between the hulls of the craft or boat. In accordance with this particular example, the four scoop support members are about twenty-four feet long.

Thus, it will be appreciated that as a result of the present invention, a highly effective improved oil spill clean up craft and method is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, and not limiting, and that the true spirit and scope of the present invention be determined by reference to the appended claims.

What is claimed as invention is:

1. A self-contained oil spill cleanup craft which not only provides for removing an oil/water mixture from the surface of a body of water, such as a sea, ocean, or lake, but also separates and processes the removed oil/water mixture into separate oil and water components in a manner allowing the water component to be returned to the body of water and the oil component to be used for its intended commercial purpose without further processing, comprising:
 a small waterplane area boat having at least two parallel, spaced hulls connected at their upper ends by a deck and having respective pontoons attached to the base of each hull,
 wherein the pontoons lie submerged beneath the water during boat operation to add stability to the boat,
 a lower surface of the deck is located near the top of the two hulls and above the surface of the body of water so that there exists an opening below the deck and between the hulls extending the length of the boat,
 a height adjustable scoop means attached to the deck of the boat and including a depending scoop located in the opening below the deck and between the hulls in a manner allowing for adjustment of the distance between the deck and the scoop so that the scoop can be moved to an operative position in the water to act as a skimmer for skimming an oil/water mixture from the surface of the body of water,
 pump means for pumping the skimmed oil/water mixture from the scoop to separation and processing means on the deck for separating and processing the mixture into separate oil and water components sufficiently to allow the water component to be returned to the body of water and the oil component to be stored in oil storage means for later direct commercial use.

2. The craft of claim 1 wherein said oil/water mixture includes sludge and said separation and processing means includes sludge separation means for removing sludge from the oil and water components.

3. The craft of claim 1 wherein said oil/water mixture includes sludge and said separation and processing means includes a cross flow separator for receiving the oil/water mixture from the pump means and hydraulically separating the mixture into oil, water, and sludge streams which are further processed to produce the oil and water components.

4. The craft of claim 3 wherein said cross flow separator is a multiple corrugated plate collator.

5. The craft of claim 3 wherein said separation and processing means includes means for adding de-emulsifying and floculant additives to the oil stream.

6. The craft of claim 5 wherein said separation and processing means includes a strainer for separating solids out of the oil stream, said strainer having a strained oil output and a solids output.

7. The craft of claim 6 wherein said separation and processing means includes a heat exchanger for raising the temperature of the strained oil output to about 175° to 200° F.

8. The craft of claim 6 wherein said heat exchanger is a high heat transfer tube and shell construction heat exchanger.

9. The craft of claim 6 wherein said separation and processing means includes a high speed centrifuge for receiving the heated, strained oil from the heat exchanger and separating it into centrifuged water, oil, and sludge components.

10. The craft of claim 9 wherein said high speed centrifuge is a fully automated high speed disc centrifuge.

11. The craft of claim 9 wherein the centrifuged oil component is fed to said oil storage means.

12. The craft of claim 11 wherein said oil storage means is a tank on said boat.

13. The craft of claim 11 wherein said oil storage means is at least one oil bladder towed behind said boat.

14. The craft of claim 11 wherein said oil storage means is a pair of oil bladders towed behind said boat.

15. The craft of claim 11 wherein the water stream from said cross flow separator is fed to an oil monitor means for testing the water stream to see if it is clean enough to dump back into the body of water.

16. The craft of claim 15 wherein the oil monitor means is an oil concentration detector with a 0 to 100 ppm adjustable range and provides continuous sampling every 15 seconds.

17. The craft of claim 15 wherein said oil monitor means passes clean water to a drain element for return to the body of water and diverts dirty water to an oily water separator.

18. The craft of claim 17 wherein said oily water separator is a liquid/liquid type hydrocyclone.

19. The craft of claim 17 wherein said oily water separator also receives the water component from said high speed centrifuge and has an oil output which is fed to said oil storage means and a clean water output which is returned to the body of water.

20. The craft of claim 19 wherein the sludge output of said cross flow separator is fed to sludge processing means for separating the sludge into dry sludge and oily water components.

21. The craft of claim 20 wherein said sludge processing means is a variable speed decanter.

22. The craft of claim 20 wherein said sludge processing means also receives sludge input from said strainer and said high speed centrifuge.

23. The craft of claim 22 wherein dry sludge from said sludge processing means is transferred to a sludge storage means.

24. The craft of claim 22 wherein the oily water output of said sludge processing means is fed to said oily water separator.

25. The craft of claim 1 wherein said pump means pumps about 3800 gallons per minute of oil/water mixture from the scoop to the separation and processing means, and wherein said separation and processing means outputs about 1000 gallons per minute of oil component and 2800 gallons per minute of water component.

26. The craft of claim 3 wherein said crossflow separator receives about 3800 gallons of oil/water mixture from said pump means and outputs about 1000 gallons per minute oil stream and a 2800 gallons per minute water stream.

27. The craft of claim 1 wherein said pump means includes oversized piping and at least one low head pump for pumping the oil/water mixture from the rear of the scoop to said separation and processing means in an unemulsified state.

28. The craft of claim 27 wherein said at least one low head pump comprises two low velocity, low head pumps.

29. The craft of claim 28 wherein said pumps comprise screw-type centrifugal pumps which are capable of pumping about 2000 gallons per minute.

30. The craft of claim 29 wherein said scoop includes substantially vertical side walls, a substantially horizontal base, a downwardly sloping upper wall, an open front, and a closed rear, and wherein said upper wall includes a pair of cylindrical openings near the rear of the scoop for receiving the suction ends of said pumps.

31. The craft of claim 30 wherein said scoop further includes a raised section extending upwardly from the base near the rear of the scoop and including two arcuate vortex creating recesses each associated with one of said pumps for facilitating the pickup of extremely viscous liquids and extremely light liquids.

32. The craft of claim 31 wherein each of said vortex creating recesses extends from a respective side of the rear of said scoop toward the middle of said scoop, so that each of said pumps serve a respective half of said scoop and together pull liquid from the entire width of the scoop.

33. A system for cleaning an oil spill from a body of water, such as a sea, ocean, or lake, comprising:

scoop means for skimming oil, sludge and water from the surface of a body of water, transfer means for transferring the skimmed oil, sludge and water from the scoop means to separation and processing means, said separation and processing means being operable for separating and purifying said skimmed oil, sludge and water into oil, water, and sludge output streams with the water output stream being sufficiently cleaned so as to be in condition for return to the body of water and with the oil output stream being sufficiently cleaned so as to be fed to oil storage means for direct commercial use, and flotation means comprising a small waterplane area twin hull boat having two, parallel, spaced hulls connected at their upper ends by a deck and having respective pontoons attached to the base of each hull for supporting said scoop means and said separation and processing means.

34. The system of claim 33 further comprising sludge processing means for removing oil from said sludge output stream sufficiently to allow deoiled sludge to be returned to the body of water.

35. The system of claim 33 wherein said separation and processing means includes a cross flow separator for receiving the oil, sludge and water from the transfer means and hydraulically separating the oil and water into oil and water output streams.

36. A method of cleaning an oil spill from a body of water, such as a sea, ocean, or lake, comprising the steps of:

skimming oil, sludge and water from the surface of said body of water using a scoop mounted between the hulls of a small waterplane area twin hull boat having two parallel, spaced hulls connected at their upper ends by a deck and having respective pontoons attached to the base of each hull, separating and processing said skimmed oil, sludge and water sufficiently to separate said skimmed oil, sludge and water into a commercial grade oil output, a cleaned water output sufficiently clean for return to said body of water, and a sludge output using continuous flow separating and processing means carried by said twin hull boat, and storing said commercial grade oil output in oil storage means for later commercial use.

37. The method of claim 36 wherein said step of storing said oil comprises storing said oil in an oil bladder means towed behind said boat.

* * * * *